United States Patent Office 3,467,550
Patented Sept. 16, 1969

3,467,550
DEVICE IN ELECTRICAL STORAGE BATTERIES AND METHODS FOR MOUNTING SAID DEVICE
Rolf F. G. Thörnblad, Oskarshamn, Sweden, assignor to Svenska Ackumulator Aktiebolaget Jungner, Oskarshamn, Sweden
Filed May 23, 1966, Ser. No. 552,053
Claims priority, application Sweden, May 28, 1965, 7,052/65
Int. Cl. H01m 39/02
U.S. Cl. 136—79      5 Claims

ABSTRACT OF THE DISCLOSURE

An electric storage battery having a container with sidewalls and partitions for holding a plurality of cells made up of a number of electrode groups. A clip-shaped brace of insulating material is used to engage the lower portion of each electrode group to compress the electrode group and to engage the sidewalls and partitions of the container for guiding and holding the electrode groups during and after assembling of the battery.

---

Figure 1:
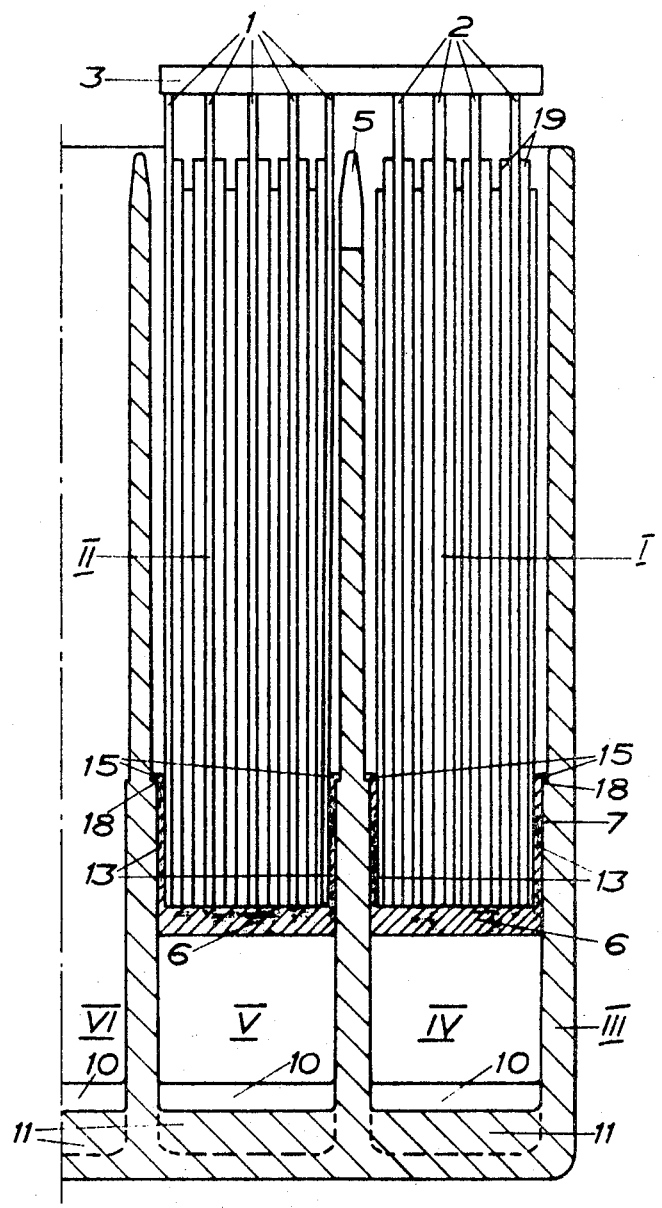

The present invention relates to a storage battery consisting of two or more cells fitted in a container. In such single or multiple cell storage batteries the electrodes in each cell are forming electrode groups, which are surrounded by the container walls or partitions, respectively. In assembling, said group must be compressed and fixed relatively to the container walls. To that purpose a number of plates of generally insulating material, as separators for instance, are usually inserted between the outer electrodes of the group and the container walls. This operation is time-consuming and the pressure which is exerted on the electrodes is not easily measurable and therefore the ability of the battery to withstand vibration depends upon the skill of the operator.

The present invention has for its purpose to avoid these drawbacks and to provide a compression and positioning of the electrode groups with an exactly reproducible force. The invention consists essentially in a device comprising one or more clip-shaped braces of preferably electric insulating material which are gripping round the lower part of each electrode group. It is preferable to have said clip or clips gripping round the lower end of the electrode group, the clip or clips being made of resilient material and having essentially the shape of a U with its shanks directed upwards and partly bent outwards so as to form resilient members for engaging the container walls or partitions, respectively.

It is also suitable that the yoke part of each clip which is intended to rest against the container bottom or a supporting ridge on said bottom, be provided with a straight and profiled shape and with a certain rigidity and resilience so as to attain a uniform bearing for the lower edge of every electrode plate in the group. In addition, the clip shanks may be provided with a lower part stretching essentially perpendicularly to the yoke part or directed slightly inwards toward the middle of the clip, and an outwardly bent upper part.

According to an embodiment of the invention, the upper outwardly bent part of the clip shanks is provided with a ridge arranged perpendicularly to the direction of the shank said ridge being directed outwardly towards the container wall and arranged to engage said wall. The side walls and the partitions, respectively, are provided with vertical ridges, the number of which corresponds to the number of clips on each electrode group, said ridges being provided with a shoulder at a distance from the top of the container which is somewhat less than the distance between the upper edge of a clip mounted on the electrode group and the upper edge of the electrode, the transverse ridge of the clip being intended to rest temporarily on said shoulder as the group is being lowered into the container.

In order to guide the clips sideways while the group of electrodes is being lowered into the container, it is also suitable to provide the container wall or partitions with ridges, which are narrower at the top and wider at the bottom, one on each side of each ridge provided with a shoulder.

The present invention also relates to a method of assembling storage batteries in which the aforesaid clips are used, the method comprising the steps of clamping by means of a number of U-shaped resilient clips the lower part of a group of electrodes forming a cell preassembled in a conventional manner; lowering the electrode group in the storage battery container until the clips resiliently engage corresponding shoulders provided on the container walls and partitions, respectively, so that only the upper part of the electrode groups and the electrode lugs project above the container edges; connecting the positive electrodes of one cell to the negative electrode of an adjacent cell in a conventional manner by means of a connecting bar fastened by welding or soldering; and finally pressing down simultaneously all the electrode groups of the storage battery in final position the container by overcoming the resilient engagement between the clips and the shoulders provided in the container.

By using this method, the welding or soldering of the connecting bars can be performed without the container risking to be excessively heated and damaged. The method furthermore provides a very convenient, time-saving and reproducible assembling process well suited for mass production.

Figure 2:
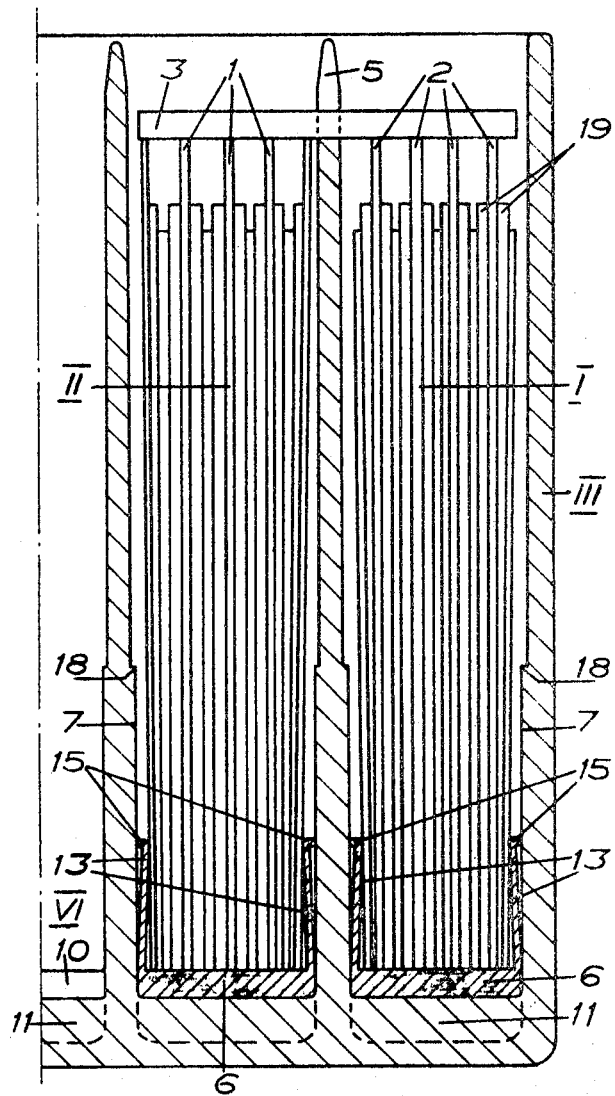
Figure 3:
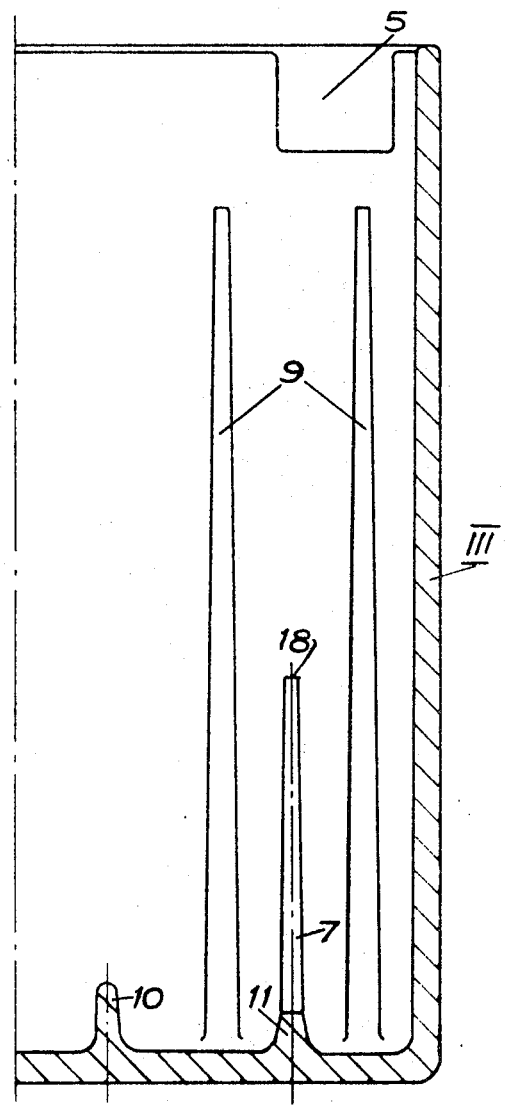
Figure 4:
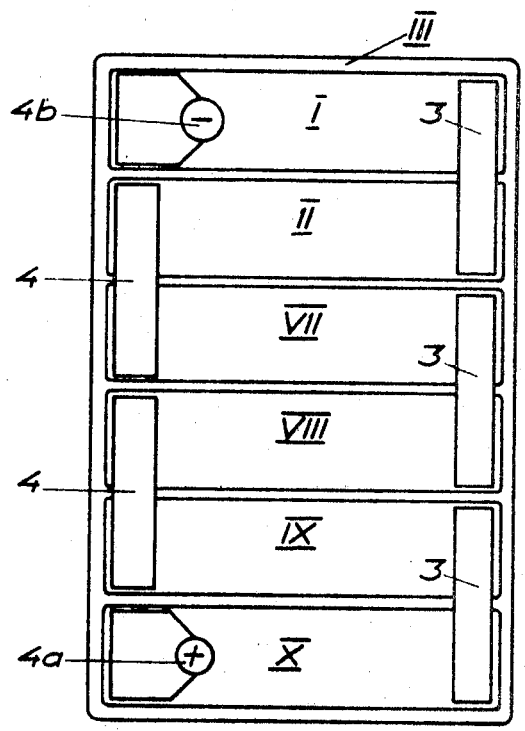
Figure 5A:
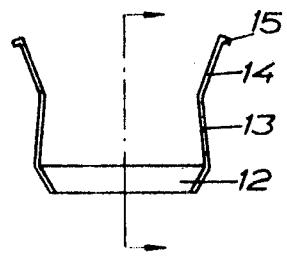
Figure 5B:
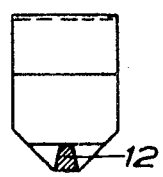
Figure 6A:
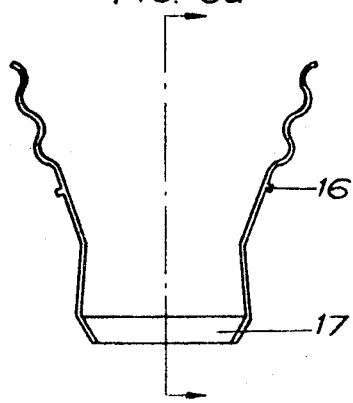
Figure 6B:
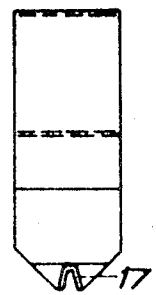

The invention will be described more in detail with reference being made to the appended drawings, in which FIGURE 1 is a fragmentary sectional view through a storage battery container with two electrode groups partly inserted into said container, FIGURE 2 is a view similar to FIGURE 1 but showing the electrode groups entirely lowered in the container, FIGURE 3 is a fragmentary detail sectional view of the storage battery container, FIGURE 4 is a top plan view of the storage battery, and FIGURES 5 and 6 show two different embodiments of the clips of the invention.

As appears from FIGURE 1, two electrode groups I and II, respectively, preassembled in a conventional manner have been clamped at the lower part by means of clips 6 and thereafter lowered in compartments IV and V, respectively, in the storage battery container III. In this process, the shanks 13 of the clips 6 as well as transverse ridges 15 provided on said shanks being brought in engagement with shoulders 18 on ridges 7 provided on the storage battery walls after having been slid along the battery container sidewalls and partitions, respectively.

The electrode groups are constituted by alternately stacked positive and negative electrodes held in spaced relationship by separators 19. In the electrode group II the lugs 1 of the negative electrodes, in FIGURE 1 nearest to the onlooker, are projecting above the upper edge of the electrode group while the corresponding lugs 2 of the positive electrodes in the electrodes group I are projecting accordingly. The electrode groups being in the position shown in FIGURE 1, both said groups of lugs are interconnected by means of a connector strap 3 which is welded or soldered to said lugs 1 and 2. On that side which is opposite to the onlooker the positive electrodes of group II are also provided with lugs 2 which are connected by means of a connector strap 4 (FIGURE 4) to the negative lugs of the electrode group VII inserted into the compartment VI of the storage battery and shown in FIGURE 4 but not in FIGURES 1 and 2.

In the position of the electrode groups shown in FIGURE 1 the connections of the lugs with said connector straps by means of welding or soldering can be performed without the container risking to be excessively heated or damaged. After the connection has been achieved all the electrode groups I, II, VII, VIII, IX and X of all the cells in the storage battery (FIGURE 4) are pushed down simultaneously into the final position shown in FIGURE 2 whereupon the cover of the storage battery container can be mounted as well as the terminal posts 4a, 4b (FIGURE 4).

As shown in FIGURE 3, the storage battery container walls are provided partly with the aforesaid ridges 7 with a shoulder 18 and partly with ridge 9 for guiding the clips 6 sideways during the lowering of the electrode groups in the container. The container bottom is provided partly with ridges 10 on which the electrode groups will rest after having been pushed down into the container or at least after the electrodes have expanded after a certain period of operation, and partly with somewhat lower ridges 11 on which the clips 6 will rest. The first container partition is provided with a recess 5 for the passage of the connector bar 3. Corresponding recesses are also provided in the remaining partitions.

FIGURES 5 and 6 show two different embodiments of the clips 6. The clips in FIGURE 5 are provided with a solid rib 12, the height of which is equal to the difference in height between the ridges 10 and 11 on the container bottom or somewhat greater than said difference. The upwardly directed clip shanks 13 are at the bottom perpendicular to the rib 12 or slightly bent inwardly while the upper parts 14 bent outwardly. In addition, the uppermost parts 15 of said shanks are bent so as to be about perpendicular to the shank parts 14. Ridges 15 are thus provided, which form a distinct stop which will carry the electrode groups in the position shown in FIGURE 1 while said ridges are engaging the shoulder 18 on ridges 7.

The clips shown in FIGURE 6 differ from the one shown in FIGURE 5 essentially in that the upper part of the shanks is corrugated and that a ridge or bead 16 is provided immediately below the corrugated part, said ridge or bead 16 having the same function as the ridge 15 in FIGURE 5. In addition, the rib 17 corresponding to rib 12 in FIGURE 5 has a U-shaped section whereby the clip will be somewhat resiliently supported on the ridges 11 and 7. The total height of the ridge 7 and the ridge 11 should be slightly greater than the height of the ridges 10. This arrangement provides the advantage that the electrodes have a possibility to expand somewhat towards the container bottom. While the storage battery is in operation, the positive electrodes expand slightly and would otherwise exert a pressure against the cover, the glued joint of which might burst. The risk for damages due to said extension is greatest when it occurs in the vicinity of the positive electrode lugs.

Although the invention has been described in connection with an embodiment shown in the drawings, it is obvious that many operations or modifications may be made within the scope of the appending claims.

What I claim is:

1. In an electric storage battery comprising a container having walls, a plurality of cells in said container, each of said cells having electrode groups, partition walls between said cells, a number of U-shaped clips of resilient electric insulating material for gripping the lower part of said electrode groups and for compressing the electrode groups of said cells in order to fix them between the walls of said container and said partitions, said U-shaped clips having a yoke portion and two shank portions, each of said shank portions having a ridge extending perpendicularly to the direction of said shanks and outwardly toward said container wall for engaging said container wall, said container and partition walls being provided with vertical ridges, the number of said ridges corresponding to the number of clips in each of said electrode groups, said ridges being further provided with a shoulder at a distance from the top of said container, said distance being somewhat less than the distance between the upper edge of a clip mounted on said electrode group and the upper edge said electrode group, such that the perpendicular ridge of said clip rests temporarily on said shoulder as said electrode group is lowered into said container.

2. In the storage battery as claimed in claim 1, wherein the yoke portion of said clips is straight and rib-shaped and has a degree of rigidity and elasticity, said yoke portion adapted to rest against a supporting ridge on the bottom of said container.

3. In the storage battery as claimed in claim 1, wherein the shanks of each of said clips are provided with a lower part essentially perpendicular to said yoke portion and an upper portion bent outwardly and containing said ridge.

4. In the storage battery as claimed in claim 1, wherein at least a portion of said clip shanks is corrugated.

5. A method of assembling storage batteries of the kind claimed in claim 1, comprising the steps of clamping the lower part of a group of electrodes forming a cell preassembled in a conventional manner and having electrode lugs associated therewith by means of a number of U-shaped resilient clips, lowering the electrode groups in the storage battery container until the clips resiliently engage corresponding shoulders provided on the container walls and partitions, respectively, so that only the upper part of said electrode groups and said electrode lugs project out of the container, connecting the positive electrodes of one cell to the negative electrodes of an adjacent cell in a conventional manner by means of a connecting bar fastened by welding or soldering, and finally simultaneously pressing all the electrode groups of the storage battery in final position in the container by overcoming the resilient engagement between the clamps and the shoulders provided in the container.

References Cited

UNITED STATES PATENTS

| 576,164 | 2/1897 | Schneider | 136—79 |
|---|---|---|---|
| 1,848,826 | 3/1932 | Crispin | 136—147 |
| 1,926,771 | 9/1933 | Henry | 136—147 |
| 2,113,938 | 4/1938 | Gill | 136—79 |
| 2,478,887 | 8/1949 | Nelson | 136—173 |
| 2,820,080 | 1/1958 | Kaljot | 136—181 |
| 2,851,511 | 9/1958 | Bikerman | 136—147 |
| 2,983,778 | 5/1961 | Munse | 136—173 |
| 3,181,974 | 5/1965 | La Barbera | 136—173 |

FOREIGN PATENTS

| 153,570 | 2/1922 | Great Britain. |
|---|---|---|
| 1,095,902 | 12/1954 | Germany. |

WINSTON A. DOUGLAS, Primary Examiner

PETER D. ROSENBERG, Assistant Examiner

U.S. Cl. X.R.

136—143, 173